(12) United States Patent
Noda

(10) Patent No.: US 8,547,650 B2
(45) Date of Patent: Oct. 1, 2013

(54) IMAGING LENS ASSEMBLY

(75) Inventor: Sayuri Noda, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 64 days.

(21) Appl. No.: 13/333,666

(22) Filed: Dec. 21, 2011

(65) Prior Publication Data

US 2012/0092544 A1 Apr. 19, 2012

Related U.S. Application Data

(62) Division of application No. 12/625,710, filed on Nov. 25, 2009, now Pat. No. 8,189,273.

(30) Foreign Application Priority Data

Jun. 12, 2009 (TW) ................................ 98119709 A

(51) Int. Cl.
*G02B 9/60* (2006.01)
*G02B 13/18* (2006.01)

(52) U.S. Cl.
USPC ........................... 359/766; 359/714; 359/764

(58) Field of Classification Search
USPC ................. 359/766, 758, 754–757, 763–764, 359/713–714
See application file for complete search history.

(56) References Cited

U.S. PATENT DOCUMENTS

| | | | | |
|---|---|---|---|---|
| 7,502,181 B2 * | 3/2009 | Shinohara | ..................... | 359/764 |
| 7,826,151 B2 * | 11/2010 | Tsai | .............................. | 359/764 |
| 7,864,454 B1 * | 1/2011 | Tang et al. | ..................... | 359/764 |
| 2011/0134305 A1 * | 6/2011 | Sano et al. | ..................... | 348/340 |

* cited by examiner

*Primary Examiner* — Jordan Schwartz
(74) *Attorney, Agent, or Firm* — Morris Manning & Martin LLP; Tim Tingkang Xia, Esq.

(57) ABSTRACT

The present invention provides an imaging lens assembly, comprising in order from an object side toward an image side, a first lens element with positive refractive power having a convex object-side surface, a second lens element with negative refractive power having a concave object-side surface and a convex image-side surface, a third lens element with positive refractive power having a concave object-side surface and a convex image-side surface, a fourth lens element with negative refractive power, a fifth lens element with positive refractive power, and an aperture stop positioned between an imaged object and the first lens element. The above lens arrangement shortens the total track length effectively, enabling a high performance imaging lens assembly with a wide field of view.

11 Claims, 17 Drawing Sheets

| TABLE 1 | | | | | | | |
|---|---|---|---|---|---|---|---|
| (Embodiment 1) | | | | | | | |
| f(focal length) = 3.63 mm, Fno =3.4, HFOV (half of field of view) = 40.6 deg. | | | | | | | |
| Surface # | | Curvature Radius | Thickness | Material | Index | Abbe # | Focal length |
| 0 | Object | Plano | Infinity | | | | |
| 1 | Aperture Stop | Plano | -0.063 | | | | |
| 2 | Lens 1 | 2.07789(ASP) | 0.403 | Plastic | 1.544 | 55.9 | 3.59 |
| 3 | | -30.49513(ASP) | 0.419 | | | | |
| 4 | Lens 2 | -3.67274(ASP) | 0.300 | Plastic | 1.632 | 23.4 | -7.00 |
| 5 | | -22.30057(ASP) | 0.383 | | | | |
| 6 | Lens 3 | -1.56161(ASP) | 0.583 | Plastic | 1.530 | 55.8 | 8.53 |
| 7 | | -1.31097(ASP) | 0.050 | | | | |
| 8 | Lens 4 | 1.45689(ASP) | 0.373 | Plastic | 1.530 | 55.8 | -7.17 |
| 9 | | 0.95972(ASP) | 0.239 | | | | |
| 10 | Lens 5 | 0.94999(ASP) | 0.460 | Plastic | 1.530 | 55.8 | 5.45 |
| 11 | | 1.17824(ASP) | 1.002 | | | | |
| 12 | IR-filter | Plano | 0.210 | Glass | 1.517 | 64.2 | |
| 13 | | Plano | 0.497 | | | | |
| 14 | Image | Plano | | | | | |

Fig.5

| TABLE 2 (Embodiment 1) | | | | | |
|---|---|---|---|---|---|
| Aspheric Coefficients | | | | | |
| Surface # | 2 | 3 | 4 | 5 | 6 |
| k = | -2.35071E+00 | 1.00000E+00 | 4.78742E-01 | 1.00000E+00 | -9.87709E+00 |
| A4 = | -1.86129E-02 | -1.24705E-01 | -9.81434E-02 | 3.92755E-02 | -9.92101E-02 |
| A6 = | -8.61436E-02 | -1.54101E-01 | -1.10843E-01 | -4.43242E-02 | 1.62334E-01 |
| A8 = | -7.46184E-02 | -2.51762E-02 | -3.56069E-02 | 1.25447E-03 | -8.81170E-02 |
| A10 = | -1.10412E-01 | -1.49055E-02 | 2.38499E-02 | 1.60750E-02 | 2.30350E-02 |
| A12 = | -6.27208E-02 | -2.53763E-01 | 2.21727E-01 | 6.39936E-03 | -1.83926E-02 |
| A14 = | -1.09998E-01 | -3.41684E-01 | 2.09380E-01 | 2.98756E-02 | 6.51922E-03 |
| A16 = | -2.51039E-01 | 1.15796E+00 | -1.66568E-01 | -1.46172E-02 | 3.42761E-03 |
| Surface # | 7 | 8 | 9 | 10 | 11 |
| k = | -1.08903E+00 | -7.55181E+00 | -5.53853E+00 | -4.10025E+00 | -4.10448E+00 |
| A4 = | -3.86062E-02 | -3.67324E-02 | -2.63247E-02 | -1.57620E-02 | -2.10110E-02 |
| A6 = | 3.28687E-02 | 1.10149E-02 | 3.79537E-03 | -7.24179E-04 | -1.56642E-04 |
| A8 = | -2.98611E-03 | -2.37879E-03 | -8.50733E-04 | 4.03066E-05 | 4.25333E-05 |
| A10 = | 1.06665E-02 | 2.84417E-04 | 6.95419E-05 | 3.68092E-06 | 8.95803E-06 |
| A12 = | -9.28336E-04 | 1.01984E-05 | 3.60437E-07 | 1.28828E-06 | 2.59219E-07 |
| A14 = | -7.81953E-04 | -5.53529E-06 | -1.54950E-07 | | |

Fig.6

| TABLE 3 | | | | | | | |
|---|---|---|---|---|---|---|---|
| (Embodiment 2) | | | | | | | |
| f(focal length) = 3.63 mm, Fno =3.4, HFOV (half of field of view) = 39.7 deg. | | | | | | | |
| Surface # | | Curvature Radius | Thickness | Material | Index | Abbe # | Focal length |
| 0 | Object | Plano | Infinity | | | | |
| 1 | Aperture Stop | Plano | -0.053 | | | | |
| 2 | Lens 1 | 2.50886(ASP) | 0.375 | Plastic | 1.544 | 55.9 | 4.36 |
| 3 | | -40.70850(ASP) | 0.577 | | | | |
| 4 | Lens 2 | -3.85488(ASP) | 0.315 | Plastic | 1.632 | 23.4 | -13.54 |
| 5 | | -7.23468(ASP) | 0.378 | | | | |
| 6 | Lens 3 | -1.54205(ASP) | 0.684 | Plastic | 1.530 | 55.8 | 6.90 |
| 7 | | -1.25128(ASP) | 0.050 | | | | |
| 8 | Lens 4 | 2.26045(ASP) | 0.301 | Plastic | 1.614 | 25.6 | -5.59 |
| 9 | | 1.29408(ASP) | 0.050 | | | | |
| 10 | Lens 5 | 1.00184(ASP) | 0.627 | Plastic | 1.530 | 55.8 | 5.28 |
| 11 | | 1.22183(ASP) | 0.999 | | | | |
| 12 | IR-filter | Plano | 0.210 | Glass | 1.517 | 64.2 | |
| 13 | | Plano | 0.584 | | | | |
| 14 | Image | Plano | | | | | |

Fig.7

| TABLE 4 (Embodiment 2) | | | | | |
|---|---|---|---|---|---|
| Aspheric Coefficients | | | | | |
| Surface # | 2 | 3 | 4 | 5 | 6 |
| k = | -3.68173E+00 | 9.98198E-01 | 9.86086E-01 | -8.28266E+01 | -8.36912E+00 |
| A4 = | -1.00982E-02 | -6.51899E-02 | -4.97175E-02 | 1.27292E-02 | -2.26708E-02 |
| A6 = | -3.49893E-02 | -5.42039E-02 | -1.76661E-02 | -6.83692E-03 | 2.47069E-02 |
| A8 = | -4.31823E-02 | -2.90511E-02 | 9.95833E-03 | 1.31816E-03 | -7.50120E-03 |
| A10 = | -2.65579E-02 | -2.16090E-02 | -1.48720E-02 | 5.83740E-04 | -3.85427E-04 |
| A12 = | -8.26587E-02 | -5.20512E-02 | 2.48570E-02 | 7.56875E-04 | -6.53415E-04 |
| A14 = | -7.29606E-04 | -1.58278E-03 | 1.86306E-04 | -7.61885E-05 | 1.71412E-05 |
| A16 = | -7.67436E-04 | 3.52884E-03 | -1.64738E-03 | 1.00393E-04 | 1.07881E-04 |
| Surface # | 7 | 8 | 9 | 10 | 11 |
| k = | -1.34371E+00 | -9.89731E+00 | -5.45889E+00 | -3.56673E+00 | -4.04336E+00 |
| A4 = | -9.85045E-03 | -1.42051E-02 | -1.33300E-02 | -1.76412E-02 | -2.10407E-02 |
| A6 = | 2.86092E-03 | 1.41937E-03 | 4.85911E-04 | -2.74839E-04 | 4.74202E-04 |
| A8 = | -4.76165E-05 | -2.17677E-04 | -4.63595E-05 | 3.04257E-05 | -2.86040E-05 |
| A10 = | 7.38614E-04 | -9.89849E-07 | 4.29034E-06 | 3.56162E-06 | -4.14126E-06 |
| A12 = | 2.11309E-04 | -1.02683E-06 | 2.35828E-07 | 5.04679E-07 | -4.17695E-07 |
| A14 = | 8.69136E-05 | -1.19252E-07 | 1.17276E-08 | | |

Fig.8

| TABLE 5 | | | | | | |
|---|---|---|---|---|---|---|
| (Embodiment 3) | | | | | | |
| f(focal length) = 3.63 mm, Fno =2.8, HFOV (half of field of view) = 40.3 deg. | | | | | | |
| Surface # | | Curvature Radius | Thickness | Material | Index | Abbe # | Focal length |
| 0 | Object | Plano | Infinity | | | | |
| 1 | Aperture Stop | Plano | -0.078 | | | | |
| 2 | Lens 1 | 2.28029(ASP) | 0.478 | Plastic | 1.544 | 55.9 | 3.65 |
| 3 | | -14.28020(ASP) | 0.393 | | | | |
| 4 | Lens 2 | -4.22251(ASP) | 0.300 | Plastic | 1.632 | 23.4 | -7.04 |
| 5 | | -85.02163(ASP) | 0.404 | | | | |
| 6 | Lens 3 | -1.60394(ASP) | 0.578 | Plastic | 1.530 | 55.8 | 7.18 |
| 7 | | -1.26906(ASP) | 0.050 | | | | |
| 8 | Lens 4 | 1.68757(ASP) | 0.389 | Plastic | 1.530 | 55.8 | -6.77 |
| 9 | | 1.05628(ASP) | 0.221 | | | | |
| 10 | Lens 5 | 0.94999(ASP) | 0.450 | Plastic | 1.530 | 55.8 | 5.87 |
| 11 | | 1.14274(ASP) | 1.002 | | | | |
| 12 | IR-filter | Plano | 0.210 | Glass | 1.517 | 64.2 | |
| 13 | | Plano | 0.497 | | | | |
| 14 | Image | Plano | | | | | |

Fig.9

| TABLE 6 (Embodiment 3) | | | | | |
|---|---|---|---|---|---|
| Aspheric Coefficients | | | | | |
| Surface # | 2 | 3 | 4 | 5 | 6 |
| k= | -2.63032E+00 | -4.86431E+00 | -6.44958E-01 | 1.00000E+00 | -9.08823E+00 |
| A4= | -1.89341E-02 | -1.10701E-01 | -9.47646E-02 | 3.10188E-02 | -9.98100E-02 |
| A6= | -5.50309E-02 | -1.31080E-01 | -9.32201E-02 | -4.49313E-02 | 1.60592E-01 |
| A8= | -4.70557E-02 | 1.20064E-02 | -2.61571E-02 | 1.09780E-03 | -8.92256E-02 |
| A10= | -7.99387E-02 | 8.85023E-02 | 2.44504E-02 | 1.38913E-02 | 2.30929E-02 |
| A12= | -1.58600E-01 | -1.19983E-01 | 2.18587E-01 | 1.95126E-03 | -1.79900E-02 |
| A14= | 4.07310E-01 | -4.59446E-01 | 1.84846E-01 | 2.62837E-02 | 6.50094E-03 |
| A16= | -2.51039E-01 | 7.13732E-01 | -2.67454E-01 | -1.33847E-02 | 2.74656E-03 |
| Surface # | 7 | 8 | 9 | 10 | 11 |
| k= | -1.13497E+00 | -7.55072E+00 | -5.48655E+00 | -3.72493E+00 | -3.72167E+00 |
| A4= | -3.66372E-02 | -3.71604E-02 | -2.84660E-02 | -1.67778E-02 | -2.20915E-02 |
| A6= | 3.23537E-02 | 1.11657E-02 | 3.98321E-03 | -1.03288E-03 | 3.97127E-05 |
| A8= | -3.18832E-03 | -2.36496E-03 | -8.15821E-04 | 5.82460E-05 | 9.23150E-06 |
| A10= | 1.05980E-02 | 2.81409E-04 | 6.96008E-05 | 7.14422E-06 | 7.36291E-06 |
| A12= | -9.66447E-04 | 9.31719E-06 | -3.05515E-07 | 1.63085E-06 | 7.72744E-07 |
| A14= | -7.72218E-04 | -5.64869E-06 | -2.07094E-07 | | |

Fig.10

| TABLE 7 | | | | | | | |
|---|---|---|---|---|---|---|---|
| (Embodiment 4) | | | | | | | |
| f(focal length) = 3.58 mm, Fno =3.4, HFOV (half of field of view) = 41.0 deg. | | | | | | | |
| Surface # | | Curvature Radius | Thickness | Material | Index | Abbe # | Focal length |
| 0 | Object | Plano | Infinity | | | | |
| 1 | Aperture Stop | Plano | -0.042 | | | | |
| 2 | Lens 1 | 2.87035(ASP) | 0.390 | Plastic | 1.544 | 55.9 | 4.14 |
| 3 | | -10.01410(ASP) | 0.541 | | | | |
| 4 | Lens 2 | -3.45326(ASP) | 0.300 | Plastic | 1.632 | 23.4 | -9.85 |
| 5 | | -8.01545(ASP) | 0.378 | | | | |
| 6 | Lens 3 | -1.56820(ASP) | 0.740 | Plastic | 1.530 | 55.8 | 5.89 |
| 7 | | -1.21450(ASP) | 0.050 | | | | |
| 8 | Lens 4 | 2.07556(ASP) | 0.300 | Plastic | 1.632 | 23.4 | -7.56 |
| 9 | | 1.36627(ASP) | 0.050 | | | | |
| 10 | Lens 5 | 1.00861(ASP) | 0.520 | Plastic | 1.530 | 55.8 | 7.98 |
| 11 | | 1.08760(ASP) | 1.071 | | | | |
| 12 | IR-filter | Plano | 0.210 | Glass | 1.517 | 64.2 | |
| 13 | | Plano | 0.597 | | | | |
| 14 | Image | Plano | | | | | |

Fig.11

| TABLE 8 (Embodiment 4) | | | | | |
|---|---|---|---|---|---|
| Aspheric Coefficients | | | | | |
| Surface # | 2 | 3 | 4 | 5 | 6 |
| k= | -7.10032E+00 | 1.00000E+00 | 1.00000E+00 | -8.28266E+01 | -9.10745E+00 |
| A4= | -2.80971E-02 | -1.08308E-01 | -7.45181E-02 | 1.64344E-02 | -2.48188E-02 |
| A6= | -6.82652E-02 | -7.53889E-02 | -3.36627E-02 | -9.76037E-03 | 4.23781E-02 |
| A8= | -6.21427E-02 | -4.78333E-02 | 2.53795E-02 | 4.77593E-03 | -1.44206E-02 |
| A10= | -7.35322E-02 | -3.69432E-02 | -2.54671E-02 | 2.39253E-03 | 8.40368E-04 |
| A12= | -8.47751E-03 | 3.19971E-02 | 8.52811E-02 | 2.57539E-03 | -8.90665E-04 |
| A14= | -2.85713E-03 | -6.32049E-03 | -1.58060E-03 | -2.60704E-04 | 4.30027E-04 |
| A16= | -3.71867E-03 | 1.71518E-02 | -1.61217E-02 | 2.60252E-04 | 4.36821E-04 |
| Surface # | 7 | 8 | 9 | 10 | 11 |
| k= | -1.44035E+00 | -9.54258E+00 | -5.90594E+00 | -3.14373E+00 | -3.28087E+00 |
| A4= | -1.85623E-02 | -1.70335E-02 | -1.63399E-02 | -1.58815E-02 | -2.01478E-02 |
| A6= | 2.17494E-03 | 2.38202E-03 | 9.49988E-04 | -7.47525E-04 | 7.73737E-04 |
| A8= | -6.88834E-05 | -3.90449E-04 | -1.32918E-04 | 2.84707E-05 | -9.15136E-05 |
| A10= | 1.63734E-03 | 1.59188E-05 | 7.66933E-06 | 1.78996E-06 | -3.62784E-06 |
| A12= | 3.07839E-04 | 2.41386E-07 | 4.60390E-07 | 3.75379E-07 | 5.86595E-09 |
| A14= | 9.65042E-05 | -3.27142E-08 | 1.10718E-08 | | |

Fig.12

| TABLE 9 | | | | |
|---|---|---|---|---|
| | Embodiment 1 | Embodiment 2 | Embodiment 3 | Embodiment 4 |
| f | 3.63 | 3.63 | 3.63 | 3.58 |
| Fno | 3.4 | 3.4 | 2.8 | 3.4 |
| HFOV | 40.6 | 39.7 | 40.3 | 41.0 |
| νd1−νd2 | 32.5 | 32.5 | 32.5 | 32.5 |
| R1/R2 | −0.07 | −0.06 | −0.16 | −0.29 |
| f3/f | 2.35 | 1.90 | 1.98 | 1.65 |
| f5/f | 1.50 | 1.45 | 1.62 | 2.23 |
| R3/R4 | 0.16 | 0.53 | 0.05 | 0.43 |
| R5/R6 | 1.19 | 1.23 | 1.26 | 1.29 |
| T12/f | 0.12 | 0.16 | 0.11 | 0.15 |
| R9/R10 | 0.81 | 0.82 | 0.83 | 0.93 |
| R1/f | 0.57 | 0.69 | 0.63 | 0.80 |
| TTL/ImgH | 1.57 | 1.68 | 1.60 | 1.64 |

Fig.13

IMAGING LENS ASSEMBLY

This application is a divisional application of U.S. patent application Ser. No. 12/625,710, filed Nov. 25, 2009, which itself claims the priority benefit of Taiwan application serial no. 98119709, filed on Jun. 12, 2009. The entirety of the above-mentioned patent applications is hereby incorporated by reference herein and made a part of specification.

BACKGROUND OF THE INVENTION

1. Field of the Invention

The present invention relates to an imaging lens assembly, and more particularly, to a compact imaging lens assembly used with a solid state electronic sensor.

2. Description of the Prior Art

In recent years, pixel sizes in photosensitive devices, such as Charge Coupled Device (CCD) and Complementary Metal-Oxide Semiconductor (CMOS) sensors, have progressively become smaller resulting in higher resolution. Therefore, the demand for the resolution of the imaging lens assembly is more critical. In addition, there is a trend toward increasing the number of lens elements in an imaging lens assembly because of the requirement that light rays incident on the photosensitive device should be nearly parallel to the optical axis. Such patent is disclosed in Japanese Patent No. 2007-264180.

With the requirement that the chief ray needs to be approximately parallel to the optical axis, the number of lenses of the imaging lens assembly increases. However, the total track length generally increases with more lens elements. Therefore, it is difficult to design a compact imaging lens assembly with a wide field of view while maintaining a compact form. In this regard, achieving both miniaturization and high performance on the imaging lens assembly is becoming difficult.

SUMMARY OF THE INVENTION

In order to overcome aforementioned problems, one aspect of the present invention provides an imaging lens assembly which comprises in order from an object side toward an image side, a first lens element with positive refractive power having a convex object-side surface, a second lens element with negative refractive power having a concave object-side surface and a convex image-side surface, a third lens element with positive refractive power having a concave object-side surface and a convex image-side surface, a fourth lens element with negative refractive power, a fifth lens element with positive refractive power, and an aperture stop positioned between an imaged object and the first lens element. The above lens configuration enables the total track length to be shortened effectively, and results in a high performance imaging lens assembly with a wide field of view.

In another aspect of the present invention, an imaging lens assembly comprises in order from an object side toward an image side, a first lens element with positive refractive power having a convex object-side surface, a second lens element with negative refractive power having a concave object-side surface, a third lens element with positive refractive power having a concave object-side surface and a convex image-side surface, a fourth lens element with negative refractive power, and a fifth lens element. In the present imaging lens assembly, an on-axis spacing between the first lens element and the second lens element is T12, a focal length of the imaging lens assembly is f, and they satisfy the relation: $0.005 < T12/f < 0.25$. The above lens configuration enables the total track length to be shortened effectively, and results in a high performance imaging lens assembly with a wide field of view.

BRIEF DESCRIPTION OF THE DRAWINGS

FIG. 5 is TABLE 1 which lists the optical data of the first embodiment.

FIG. 6 is TABLE 2 which lists the aspheric surface data of the first embodiment.

FIG. 7 is TABLE 3 which lists the optical data of the second embodiment.

FIG. 8 is TABLE 4 which lists the aspheric surface data of the second embodiment.

FIG. 9 is TABLE 5 which lists the optical data of the third embodiment.

FIG. 10 is TABLE 6 which lists the aspheric surface data of the third embodiment.

FIG. 11 is TABLE 7 which lists the optical data of the fourth embodiment.

FIG. 12 is TABLE 8 which lists the aspheric surface data of the fourth embodiment.

FIG. 13 is TABLE 9 which lists the data of the respective embodiments resulting from the equations.

DETAILED DESCRIPTION OF THE PREFERRED EMBODIMENTS

Figure 1A:
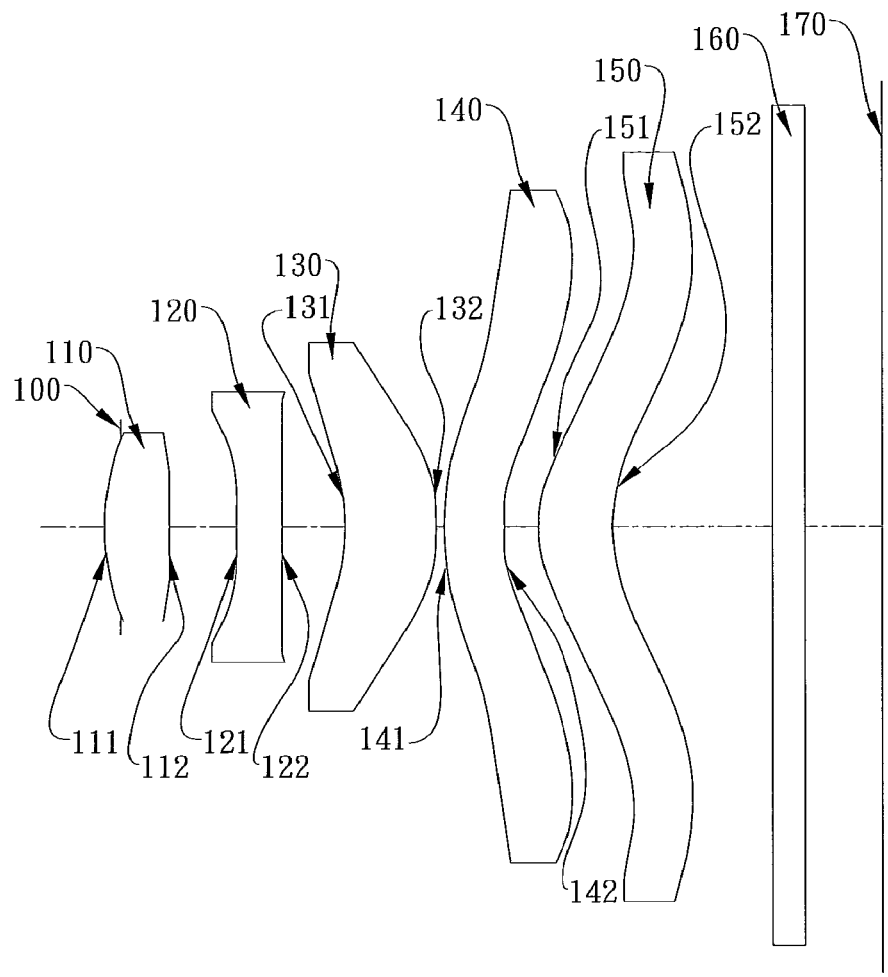
FIG. 1A shows an imaging lens assembly in accordance with a first embodiment of the present invention.

In one aspect of the present invention, an imaging lens assembly comprises in order from an object side toward an image side, a first lens element with positive refractive power having a convex object-side surface, a second lens element with negative refractive power having a concave object-side surface and a convex image-side surface, a third lens element with positive refractive power having a concave object-side surface and a convex image-side surface, a fourth lens element with negative refractive power, a fifth lens element with positive refractive power, and an aperture stop positioned between an imaged object and the first lens element.

In the present imaging lens assembly described above, locating the aperture stop between an imaged object and the first lens element is advantageous for making the chief ray nearly parallel to the optical axis. The first lens element having a larger positive refractive power allows a shorter total track length of the imaging lens assembly. The second lens element with negative refractive power facilitates the correction of the chromatic aberration of the present optical system. In addition, the third lens element with positive refractive power and the fourth lens element with negative refractive power help to improve the image quality of the periphery. The fifth lens element with positive refractive power decreases the incident angle of the light incident on the photosensitive devices effectively even if the imaging lens assembly has a wide field of view. In brief, the above lens configuration makes possible a compact high performance imaging lens assembly with a wide field of view.

Preferably in the aforementioned imaging lens assembly, the fifth lens element has a convex object-side surface and a concave image-side surface to ensure the imaging lens assembly has a back focal length that is large enough for disposing other components between the fifth lens element and the image plane, enabling the chief ray to be more nearly parallel to the optical axis.

Preferably in the aforementioned imaging lens assembly, the image-side surface of the fifth lens element is aspheric with at least one inflection point to prevent the brightness of the periphery from decreasing abruptly as the wide-viewing-angle property of the imaging lens assembly is enhanced. Furthermore, the fifth lens element is made of plastic material to facilitate fabrication of an aspheric surface with inflection point.

Further, it is preferable for the aforementioned imaging lens assembly that the fourth lens element has a convex object-side surface and a concave image-side surface to facilitate the correction of curvature of field and distortion of the image plane.

Further, it is preferable for the aforementioned imaging lens assembly that an Abbe number of the first lens element is v d 1, an Abbe number of the second lens element is v d 2, and they satisfy the relation: v d 1−v d 2>15. When the above relation is satisfied with the present invention, it facilitates the correction of the chromatic aberration of the optical system.

Further, it is preferable for the aforementioned imaging lens assembly that a radius of curvature of the object-side surface of the first lens element is R1, a radius of curvature of the image-side surface of the first lens element is R2, and they satisfy the relation: −0.4<R1/R2<0 . When the above relation is satisfied with the present invention, it facilitates the correction of the spherical aberration. In addition, since the first lens element affects the total track length of the imaging lens assembly, this helps the miniaturization of the imaging lens assembly.

Further, it is preferable for the aforementioned imaging lens assembly that a focal length of the third lens element is f3, a focal length of the imaging lens assembly is f, and they satisfy the relation: 1.4<f3/f<2.5. When the above relation is satisfied with the present invention, the chromatic aberration of magnification and the off-axis aberration of the periphery of the image can be well-corrected.

Further, it is preferable for the aforementioned imaging lens assembly that a focal length of the fifth lens element is f5, the focal length of the imaging lens assembly is f, and they satisfy the relation: 1.2<f5/f<2.5. When the above relation is satisfied with the present invention, the fifth lens element, which affects how parallel the chief ray is to the optical axis, has a more suitable refractive power to ensure the chief ray is nearly parallel to the optical axis.

Further, it is preferable for the aforementioned imaging lens assembly that a radius of curvature of the object-side surface of the second lens element is R3, a radius of curvature of the image-side surface of the second lens element is R4, and they satisfy the relation: 0<R3/R4<0.7. When the above relation is satisfied with the present invention, it facilitates the correction of the spherical aberration and the comatic aberration, making them more balanced.

Further, it is preferable for the aforementioned imaging lens assembly that a radius of curvature of the object-side surface of the third lens element is R5, a radius of curvature of the image-side surface of the third lens element is R6, and they satisfy the relation: 1.0<R5/R6<1.5. When the above relation is satisfied with the present invention, the Petzval Sum of the imaging lens assembly will not become too large, enabling the focal plane to become more flat near the periphery. Furthermore, it ensures that there is enough space between the second lens element and the third lens element to dispose light shielding elements.

Further, it is preferable for the aforementioned imaging lens assembly that an on-axis spacing between the first lens element and the second lens element is T12, the focal length of the imaging lens assembly is f, and they satisfy the relation: 0.05<T12/f<0.25. When the above relation is satisfied with the present invention, it prevents astigmatism from becoming too large.

Further, it is preferable for the aforementioned imaging lens assembly that a radius of curvature of the object-side surface of the fifth lens element is R9, a radius of curvature of the image-side surface of the fifth lens element is R10, and they satisfy the relation: 0.6<R9/R10<1.2. When the above relation is satisfied with the present invention, it prevents the periphery of the fifth lens element from over-extending toward the image plane, ensuring the imaging lens assembly has a large enough back focal length for disposing IR cut filter or sensor cover glass etc.

The aforementioned imaging lens assembly is further provided with an electronic sensor at the image plane on which an object is imaged. The on-axis spacing between the object-side surface of the first lens element and the electronic sensor is TTL, half of the diagonal length of the effective pixel area of the electronic sensor is ImgH, and they preferably satisfy the relation: TTL/ImgH<1.9. When the above relation is satisfied with the present invention, it helps to maintain the compactness of the imaging lens assembly so that it can be employed in light weight, thin, portable electronic devices.

In another aspect of the present invention, an imaging lens assembly comprises in order from an object side toward an image side, a first lens element with positive refractive power having a convex object-side surface, a second lens element with negative refractive power having a concave object-side surface, a third lens element with positive refractive power having a concave object-side surface and a convex image-side surface, a fourth lens element with negative refractive power, and a fifth lens element. In the imaging lens assembly, the on-axis spacing between the first lens element and the second lens element is T12, the focal length of the imaging lens assembly is f, and they satisfy the relation: 0.005<T12/f<0.25.

In the aforementioned imaging lens assembly, the aperture stop can be positioned between an imaged object and the first lens element or between the first lens element and the second lens element (not shown in the drawings). If the aperture stop is located between an imaged object and the first lens element, the chief ray can be made to be more nearly parallel to the optical axis. In addition, for an optical system with a wide field of view, special effort is needed to correct the distortion and chromatic aberration of magnification, and this can be accomplished by placing the aperture stop in a location where the refractive power of the optical system is balanced. In the present imaging lens assembly, if the aperture stop is disposed between the first lens element and the second lens element, the wide field of view is emphasized. Additionally, such an aperture stop placement helps to effectively reduce the sensitivity of the optical system.

In the aforementioned imaging lens assembly, the first lens element with relatively large positive refractive power allows a shortening of the total track length of the imaging lens assembly. The second lens element having negative refractive power facilitates the correction of the chromatic aberration of the optical system. The image-side surface of the second lens element can be convex or concave. The second lens element having a concave image-side surface facilitates the correction of the Petzval Sum of the imaging lens assembly, enabling the focal plane to become more flat near its periphery. In addition, the third lens element having positive refractive power and the fourth lens element having negative refractive power improve the quality of the periphery of the image. The fifth lens element can be a lens element having positive refractive power or negative refractive power. When the fifth lens element has positive refractive power, the incident angle of the light on the photosensitive devices can effectively be made smaller, even for systems with a wide field of view. When the fifth lens element has negative refractive power, the principal point of the optical system is far away from the image plane and this helps to shorten the total track length of the image lens assembly.

In the aforementioned imaging lens assembly, the on-axis spacing between the first lens element and the second lens element is T12, the focal length of the imaging lens assembly is f, and they satisfy the relation: 0.005<T12/f<0.25. When the relation above is satisfied with the present invention, it prevents the astigmatism from becoming too large.

Further, it is preferable for the aforementioned imaging lens assembly that the image-side surface of the fifth lens element is aspheric with at least one inflection point to prevent the brightness of the periphery from decreasing abruptly as the wide-viewing-angle property of the imaging lens assembly is enhanced. Furthermore, the fifth lens element is made of plastic material which helps to facilitate fabricating an aspheric surface with inflection point.

Further, it is preferable for the aforementioned imaging lens assembly that the fourth lens element has a convex object-side and a concave image-side surface to facilitate the correction of curvature of field and distortion of the image plane.

Further, it is preferable for the aforementioned imaging lens assembly that the radius of curvature of the object-side surface of the first lens element is R1, the focal length of the imaging lens assembly is f, and they satisfy the relation: 0.30<R1/f<0.75. When the relation above is satisfied with the present invention, the refractive power of the first lens element is effectively enhanced, resulting in a shorter the total track length of the imaging lens assembly, while not letting high order aberrations from becoming too large.

Further, it is preferable for the aforementioned imaging lens assembly, the radius of curvature of the object-side surface of the third lens element is R5, the radius of curvature of the image-side surface of the third lens element is R6, and they satisfy the relation: 1.0<R5/R6<1.5. When the relation above is satisfied with the present invention, the Petzval Sum of the imaging lens assembly will not become too large, enabling the focal plane to become more flat near its periphery. Furthermore, it ensures that there is enough space between the second lens element and the third lens element to dispose light shielding elements.

The aforementioned imaging lens assembly further comprises an electronic sensor positioned on the image plane on which an object is imaged. The on-axis spacing between the object-side surface of the first lens element and the electronic sensor is TTL, half of the diagonal length of the effective pixel area of the electronic sensor is ImgH, and they preferably satisfy the relation: TTL/ImgH<1.9. When the relation above is satisfied with the present invention, it helps to maintain the compactness of the imaging lens assembly so that it can be employed in light weight, thin, portable electronic devices.

In the imaging lens assembly of the present invention, the lens element can be made of glass or plastic material. If the lens element is made of glass, there is more freedom in distributing the refractive power of the system. If plastic material is adopted to produce lens element, the production cost will be reduced effectively.

In the imaging lens assembly of the present invention, if the surface of a lens element is a convex surface, it means that the surface of the lens element is convex in the paraxial region. If the surface of a lens element is a concave surface, it means that the surface of the lens element is concave in the paraxial region.

Preferred embodiments of the present invention will be described in the following paragraphs by referring to the accompanying drawings.

Figure 1B:
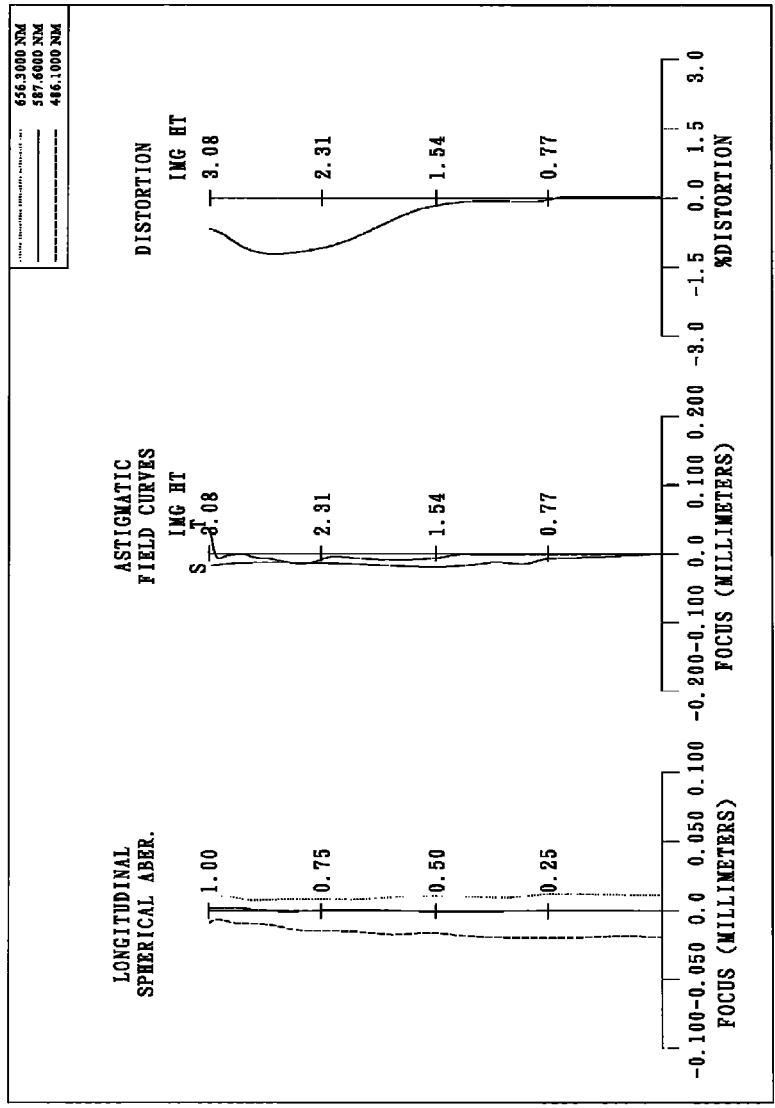
FIG. 1B shows the aberration curves of the first embodiment of the present invention.

FIG. 1A shows an imaging lens assembly in accordance with a first embodiment of the present invention, and FIG. 1B shows the aberration curves of the first embodiment of the present invention. The imaging lens assembly of the first embodiment of the present invention mainly comprises five lens elements including, in order from an object side to an image side: a plastic first lens element 110 with positive refractive power having a convex object-side surface 111 and a convex image-side surface 112, the object-side and image-side surfaces 111 and 112 thereof being aspheric; a plastic second lens element 120 with negative refractive power having a concave object-side surface 121 and a convex image-side surface 122, the object-side and image-side surfaces 121 and 122 thereof being aspheric; a plastic third lens element 130 with positive refractive power having a concave object-side surface 131 and a convex image-side surface 132, the object-side and image-side surfaces 131 and 132 thereof being aspheric; a plastic fourth lens element 140 with negative refractive power having a convex object-side surface 141 and a concave image-side surface 142, the object-side and image-side surfaces 141 and 142 thereof being aspheric; a plastic fifth lens element 150 with positive refractive power having a convex object-side surface 151 and a concave image-side surface 152, the object-side and image-side surfaces 151 and 152 thereof being aspheric, and the image-side surface 152 of the fifth lens element 150 is aspheric with at least one inflection point; and an aperture stop 100 disposed between an imaged object and the first lens element 110; in addition, an IR filter 160 is disposed between the image-side surface 152 of the fifth lens element 150 and the image plane 170, the IR filter 160 has no influence on the focal length of the imaging lens assembly.

The equation of the aspheric surface profiles is expressed as follows:

$$X(Y) = (Y^2/R)(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present imaging lens assembly, the focal length of the imaging lens assembly is f, and it satisfies the relation: f=3.63.

In the first embodiment of the present imaging lens assembly, the f-number of the imaging lens assembly is Fno, and it satisfies the relation: Fno=3.4.

In the first embodiment of the present imaging lens assembly, half of the maximal field of view of the imaging lens assembly is HFOV, and it satisfies the relation: HFOV=40.6 degrees.

In the first embodiment of the present imaging lens assembly, the Abbe number of the first lens element 110 is v d 1, the Abbe number of the second lens element 120 is v d 2, and they satisfy the relation: v d 1−v d 2=32.5.

In the first embodiment of the present imaging lens assembly, the radius of curvature of the object-side surface 111 of the first lens element 110 is R1, the radius of curvature of the image-side surface 112 of the first lens element 110 is R2, and they satisfy the relation: R1/R2=−0.07.

In the first embodiment of the present imaging lens assembly, the focal length of the third lens element 130 is f3, the focal length of the fifth lens element 150 is f5, and they satisfy the relations:

$$f3/f=2.35;$$

$$f5/f=1.50.$$

In the first embodiment of the present imaging lens assembly, the radius of curvature of the object-side surface 121 of the second lens element 120 is R3, the radius of curvature of the image-side surface 122 of the second lens element 120 is R4, the radius of curvature of the object-side surface 131 of the third lens element 130 is R5, the radius of curvature of the image-side surface 132 of the third lens element 130 is R6, and they satisfy the relations:

$$R3/R4=0.16;$$

$$R5/R6=1.19.$$

In the first embodiment of the present imaging lens assembly, the on-axis spacing between the first lens element 110 and the second lens element 120 is T12, and it satisfies the relation: T12/f=0.12.

In the first embodiment of the present imaging lens assembly, the radius of curvature of the object-side surface 151 of the fifth lens element 150 is R9, the radius of curvature of the image-side surface 152 of the fifth lens element 150 is R10, and they satisfy the relation: R9/R10=0.81.

In the first embodiment of the present imaging lens assembly, the radius of curvature of the object-side surface 111 of the first lens element 110 is R1, and it satisfies the relation: R1/f=0.57.

In the first embodiment of the present imaging lens assembly, the imaging lens assembly is further provided with an electronic sensor at the image plane 170 on which an object is imaged. The on-axis spacing between the object-side surface 111 of the first lens element 110 and the electronic sensor is TTL, half of the diagonal length of the effective pixel area of the electronic sensor is ImgH, and they satisfy the relation: TTL/ImgH=1.57.

The detailed optical data of the first embodiment is shown in FIG. 5 (TABLE 1), and the aspheric surface data is shown in FIG. 6 (TABLE 2), wherein the units of the radius of curvature, the thickness and the focal length are expressed in mm, and HFOV is half of the maximal field of view.

Figure 2A:
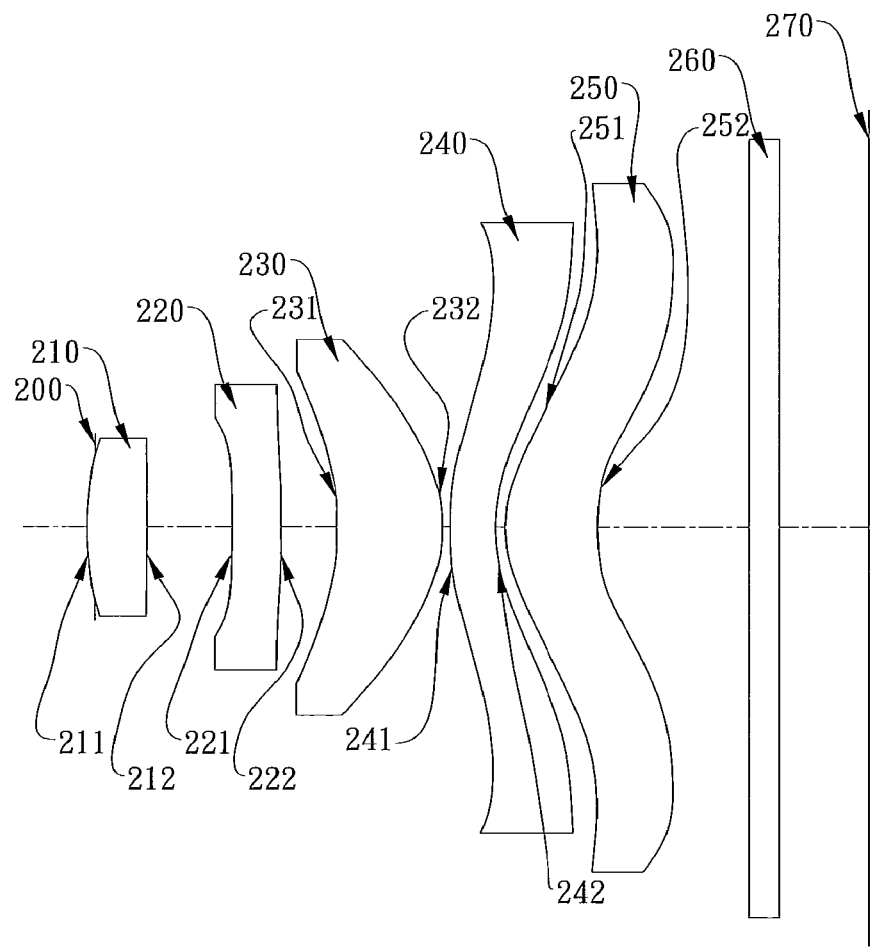
FIG. 2A shows an imaging lens assembly in accordance with a second embodiment of the present invention.
Figure 2B:
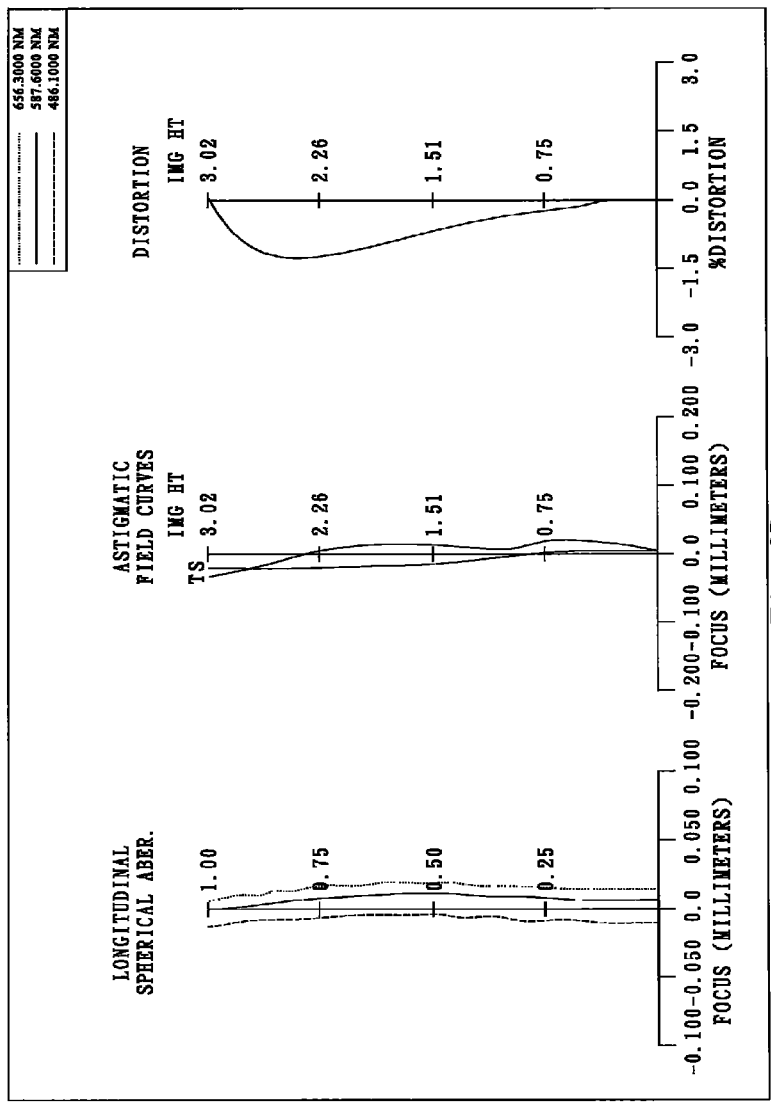
FIG. 2B shows the aberration curves of the second embodiment of the present invention.

FIG. 2A shows an imaging lens assembly in accordance with a second embodiment of the present invention, and FIG. 2B shows the aberration curves of the second embodiment of the present invention. The imaging lens assembly of the second embodiment of the present invention mainly comprises five lens elements including, in order from the object side to the image side: a plastic first lens element 210 with positive refractive power having a convex object-side surface 211 and a convex image-side surface 212, the object-side and image-side surfaces 211 and 212 thereof being aspheric; a plastic second lens element 220 with negative refractive power having a concave object-side surface 221 and a convex image-side surface 222, the object-side and image-side surfaces 221 and 222 thereof being aspheric; a plastic third lens element 230 with positive refractive power having a concave object-side surface 231 and a convex image-side surface 232, the object-side and image-side surfaces 231 and 232 thereof being aspheric; a plastic fourth lens element 240 with negative refractive power having a convex object-side surface 241 and a concave image-side surface 242, the object-side and image-side surfaces 241 and 242 thereof being aspheric; a plastic fifth lens element 250 with positive refractive power having a convex object-side surface 251 and a concave image-side surface 252, the object-side and image-side surfaces 251 and 252 thereof being aspheric, and the image-side surface 252 of the fifth lens element 250 is aspheric with at least one inflection point; and an aperture stop 200 disposed between an imaged object and the first lens element 210; in addition, an IR filter 260 is disposed between the image-side surface 252 of the fifth lens element 250 and the image plane 270, the IR filter 260 having no influence on the focal length of the imaging lens assembly.

The equation of the aspheric surface profiles of the second embodiment has the same form as that of the first embodiment.

In the second embodiment of the present imaging lens assembly, the focal length of the imaging lens assembly is f, and it satisfies the relation: f=3.63.

In the second embodiment of the present imaging lens assembly, the f-number of the imaging lens assembly is Fno, and it satisfies the relation: Fno=3.4.

In the second embodiment of the present imaging lens assembly, half of the maximal field of view of the imaging lens assembly is HFOV, and it satisfies the relation: HFOV=39.7 degrees.

In the second embodiment of the present imaging lens assembly, the Abbe number of the first lens element 210 is v d 1, the Abbe number of the second lens element 220 is v d 2, and they satisfy the relation: v d 1−v d 2=32.5.

In the second embodiment of the present imaging lens assembly, the radius of curvature of the object-side surface 211 of the first lens element 210 is R1, the radius of curvature of the image-side surface 212 of the first lens element 210 is R2, and they satisfy the relation: R1/R2=−0.06.

In the second embodiment of the present imaging lens assembly, the focal length of the third lens element 230 is f3, the focal length of the fifth lens element 250 is f5, and they satisfy the relations:

$$f3/f=1.90;$$

$$f5/f=1.45.$$

In the second embodiment of the present imaging lens assembly, the radius of curvature of the object-side surface 221 of the second lens element 220 is R3, the radius of curvature of the image-side surface 222 of the second lens element 220 is R4, the radius of curvature of the object-side surface 231 of the third lens element 230 is R5, the radius of curvature of the image-side surface 232 of the third lens element 230 is R6, and they satisfy the relations:

$$R3/R4=0.53;$$

$$R5/R6=1.23.$$

In the second embodiment of the present imaging lens assembly, the on-axis spacing between the first lens element 210 and the second lens element 220 is T12, and it satisfies the relation: T12/f=0.16.

In the second embodiment of the present imaging lens assembly, the radius of curvature of the object-side surface 251 of the fifth lens element 250 is R9, the radius of curvature of the image-side surface 252 of the fifth lens element 250 is R10, and they satisfy the relation: R9/R10=0.82.

In the second embodiment of the present imaging lens assembly, the radius of curvature of the object-side surface 211 of the first lens element 210 is R1, and it satisfies the relation: R1/f=0.69.

In the second embodiment of the present imaging lens assembly, the imaging lens assembly is further provided with an electronic sensor at the image plane 270 on which an object is imaged. The on-axis spacing between the object-side surface 211 of the first lens element 210 and the electronic sensor is TTL, half of the diagonal length of the effective pixel area of the electronic sensor is ImgH, and they satisfy the relation: TTL/ImgH=1.68.

The detailed optical data of the second embodiment is shown in FIG. 7 (TABLE 3), and the aspheric surface data is shown in FIG. 8 (TABLE 4), wherein the units of the radius of curvature, the thickness and the focal length are expressed in mm, and HFOV is half of the maximal field of view.

Figure 3A:
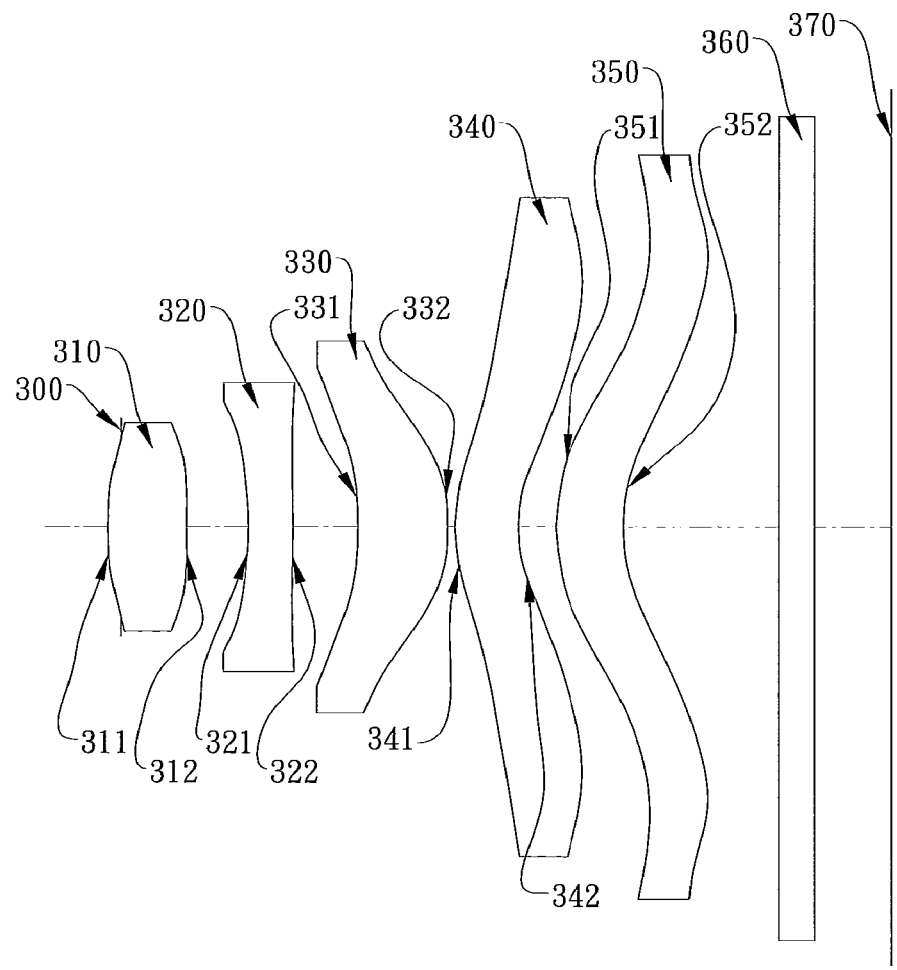
FIG. 3A shows an imaging lens assembly in accordance with a third embodiment of the present invention.
Figure 3B:
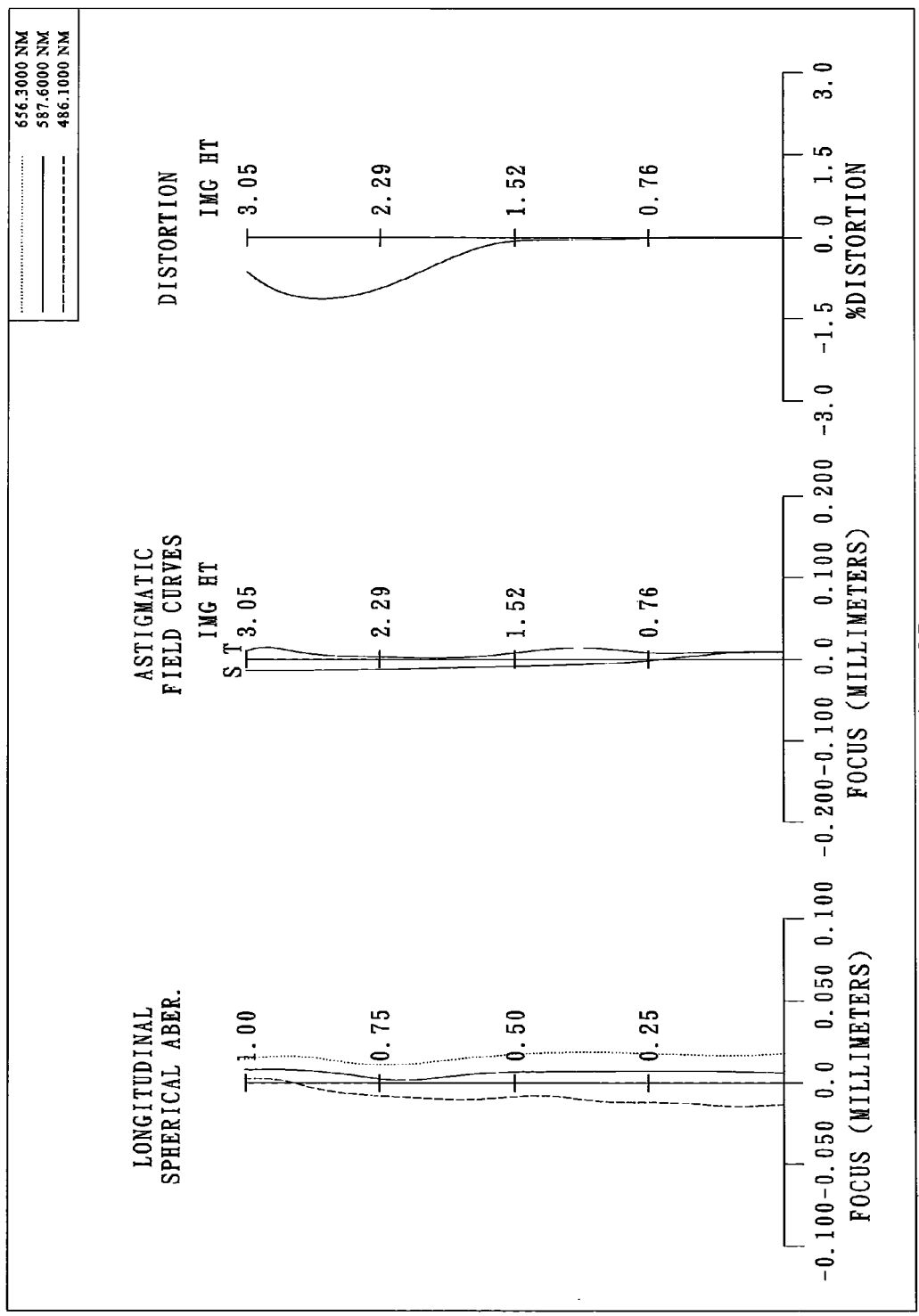
FIG. 3B shows the aberration curves of the third embodiment of the present invention.

FIG. 3A shows an imaging lens assembly in accordance with a third embodiment of the present invention, and FIG. 3B shows the aberration curves of the third embodiment of the present invention. The imaging lens assembly of the third embodiment of the present invention mainly comprises five lens elements including, in order from the object side to the image side: a plastic first lens element 310 with positive refractive power having a convex object-side surface 311 and a convex image-side surface 312, the object-side and image-side surfaces 311 and 312 thereof being aspheric; a plastic second lens element 320 with negative refractive power having a concave object-side surface 321 and a convex image-side surface 322, the object-side and image-side surfaces 321 and 322 thereof being aspheric; a plastic third lens element 330 with positive refractive power having a concave object-side surface 331 and a convex image-side surface 332, the object-side and image-side surfaces 331 and 332 thereof being aspheric; a plastic fourth lens element 340 with negative refractive power having a convex object-side surface 341 and a concave image-side surface 342, the object-side and image-side surfaces 341 and 342 thereof being aspheric; a plastic fifth lens element 350 with positive refractive power having a convex object-side surface 351 and a concave image-side surface 352, the object-side and image-side surfaces 351 and 352 thereof being aspheric, and the image-side surface 352 of the fifth lens element 350 is aspheric with at least one inflection point; and an aperture stop 300 disposed between an imaged object and the first lens element 310; in addition, an IR filter 360 is disposed between the image-side surface 352 of the fifth lens element 350 and the image plane 370, the IR filter 360 has no influence on the focal length of the imaging lens assembly.

The equation of the aspheric surface profiles of the third embodiment has the same form as that of the first embodiment.

In the third embodiment of the present imaging lens assembly, the focal length of the imaging lens assembly is f, and it satisfies the relation: f=3.63.

In the third embodiment of the present imaging lens assembly, the f-number of the imaging lens assembly is Fno, and it satisfies the relation: Fno=2.8.

In the third embodiment of the present imaging lens assembly, half of the maximal field of view of the imaging lens assembly is HFOV, and it satisfies the relation: HFOV=40.3 degrees.

In the third embodiment of the present imaging lens assembly, the Abbe number of the first lens element 310 is v d 1, the Abbe number of the second lens element 320 is v d 2, and they satisfy the relation: v d 1−v d 2=32.5.

In the third embodiment of the present imaging lens assembly, the radius of curvature of the object-side surface 311 of the first lens element 310 is R1, the radius of curvature of the image-side surface 312 of the first lens element 310 is R2, and they satisfy the relation: R1/R2=−0.16.

In the third embodiment of the present imaging lens assembly, the focal length of the third lens element 330 is f3, the focal length of the fifth lens element 350 is f5, and they satisfy the relations:

$$f3/f=1.98;$$

$$f5/f=1.62.$$

In the third embodiment of the present imaging lens assembly, the radius of curvature of the object-side surface 321 of the second lens element 320 is R3, the radius of curvature of the image-side surface 322 of the second lens element 320 is R4, the radius of curvature of the object-side surface 331 of the third lens element 330 is R5, the radius of curvature of the image-side surface 332 of the third lens element 330 is R6, and they satisfy the relations:

$$R3/R4=0.05;$$

$$R5/R6=1.26.$$

In the third embodiment of the present imaging lens assembly, the on-axis spacing between the first lens element 310 and the second lens element 320 is T12, and it satisfies the relation: T12/f=0.11.

In the third embodiment of the present imaging lens assembly, the radius of curvature of the object-side surface 351 of the fifth lens element 350 is R9, the radius of curvature of the image-side surface 352 of the fifth lens element 350 is R10, and they satisfy the relation: R9/R10=0.83.

In the third embodiment of the present imaging lens assembly, the radius of curvature of the object-side surface 311 of the first lens element 310 is R1, and it satisfies the relation: R1/f=0.63.

In the third embodiment of the present imaging lens assembly, the imaging lens assembly is further provided with an electronic sensor at the image plane 370 on which an object is imaged. The on-axis spacing between the object-side surface 311 of the first lens element 310 and the electronic sensor is TTL, half of the diagonal length of the effective pixel area of the electronic sensor is ImgH, and they satisfy the relation: TTL/ImgH=1.60.

The detailed optical data of the third embodiment is shown in FIG. 9 (TABLE 5), and the aspheric surface data is shown in FIG. 10 (TABLE 6), wherein the units of the radius of curvature, the thickness and the focal length are expressed in mm, and HFOV is half of the maximal field of view.

Figure 4A:
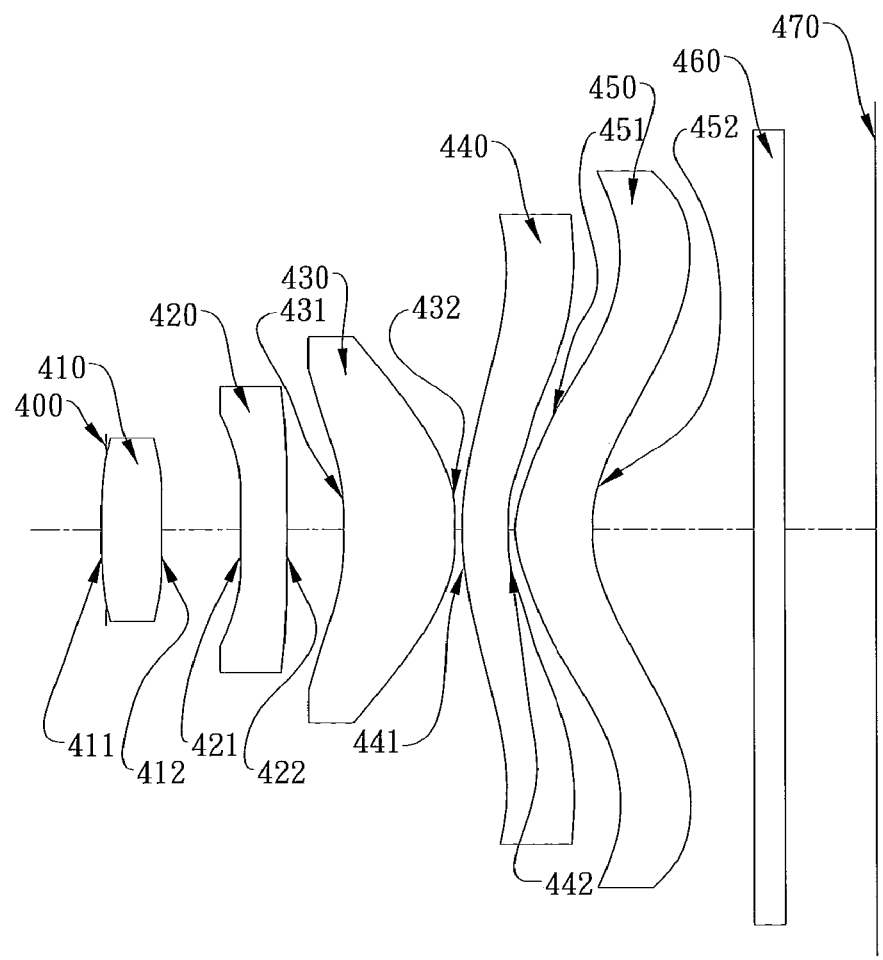
FIG. 4A shows an imaging lens assembly in accordance with a fourth embodiment of the present invention.
Figure 4B:
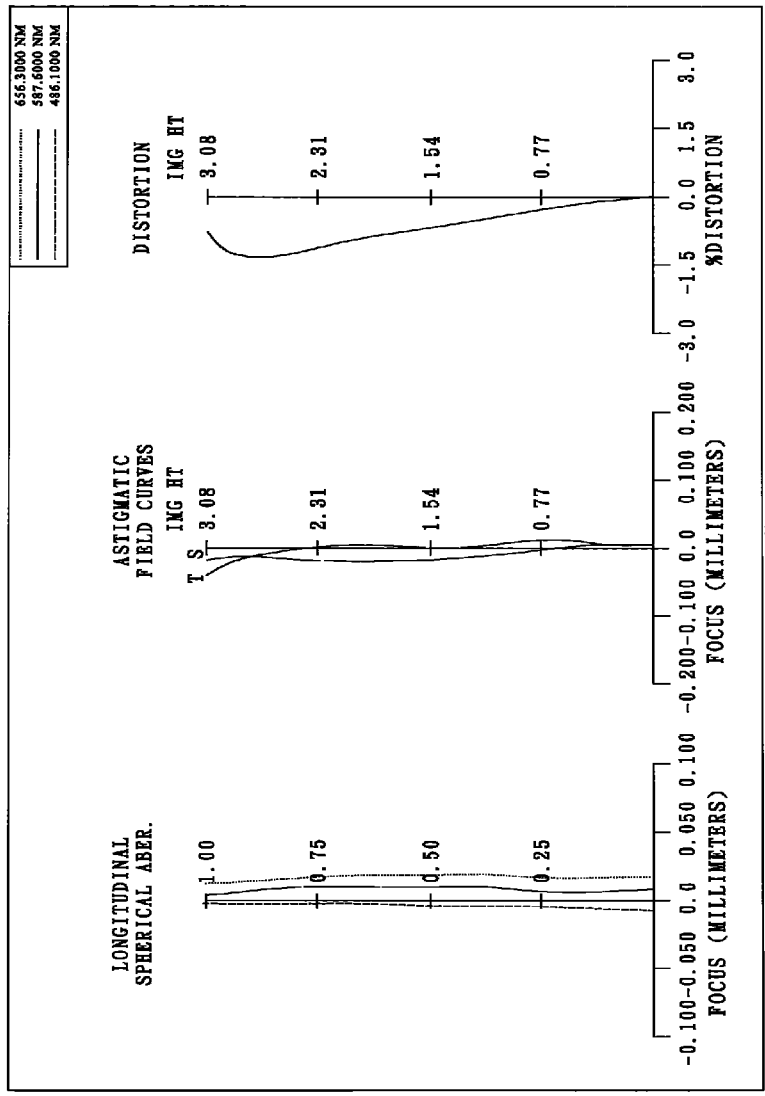
FIG. 4B shows the aberration curves of the fourth embodiment of the present invention.

FIG. 4A shows an imaging lens assembly in accordance with a fourth embodiment of the present invention, and FIG. 4B shows the aberration curves of the fourth embodiment of the present invention. The imaging lens assembly of the fourth embodiment of the present invention mainly comprises five lens elements including, in order from the object side to the image side: a plastic first lens element 410 with positive refractive power having a convex object-side surface 411 and a convex image-side surface 412, the object-side and image-side surfaces 411 and 412 thereof being aspheric; a plastic second lens element 420 with negative refractive power having a concave object-side surface 421 and a convex image-side surface 422, the object-side and image-side surfaces 421 and 422 thereof being aspheric; a plastic third lens element 430 with positive refractive power having a concave object-side surface 431 and a convex image-side surface 432, the object-side and image-side surfaces 431 and 432 thereof being aspheric; a plastic fourth lens element 440 with negative refractive power having a convex object-side surface 441 and a concave image-side surface 442, the object-side and image-side surfaces 441 and 442 thereof being aspheric; a plastic fifth lens element 450 with positive refractive power having a convex object-side surface 451 and a concave image-side surface 452, the object-side and image-side surfaces 451 and 452 thereof being aspheric, and the image-side surface 452 of the fifth lens element 450 is aspheric with at least one inflection point; and an aperture stop 400 disposed between an imaged object and the first lens element 410; in addition, an IR filter 460 is disposed between the image-side surface 452 of the fifth lens element 450 and the image plane 470, the IR filter 460 has no influence on the focal length of the imaging lens assembly.

The equation of the aspheric surface profiles of the fourth embodiment has the same form as that of the first embodiment.

In the fourth embodiment of the present imaging lens assembly, the focal length of the imaging lens assembly is f, and it satisfies the relation: f=3.58.

In the fourth embodiment of the present imaging lens assembly, the f-number of the imaging lens assembly is Fno, and it satisfies the relation: Fno=3.4.

In the fourth embodiment of the present imaging lens assembly, half of the maximal field of view of the imaging lens assembly is HFOV, and it satisfies the relation: HFOV=41.0 degrees.

In the fourth embodiment of the present imaging lens assembly, the Abbe number of the first lens element 410 is v d 1, the Abbe number of the second lens element 420 is v d 2, and they satisfy the relation: v d 1–v d 2=32.5.

In the fourth embodiment of the present imaging lens assembly, the radius of curvature of the object-side surface 411 of the first lens element 410 is R1, the radius of curvature of the image-side surface 412 of the first lens element 410 is R2, and they satisfy the relation: R1/R2=−0.29.

In the fourth embodiment of the present imaging lens assembly, the focal length of the third lens element 430 is f3, the focal length of the fifth lens element 450 is f5, and they satisfy the relations:

$$f3/f=1.65;$$

$$f5/f=2.23.$$

In the fourth embodiment of the present imaging lens assembly, the radius of curvature of the object-side surface 421 of the second lens element 420 is R3, the radius of curvature of the image-side surface 422 of the second lens element 420 is R4, the radius of curvature of the object-side surface 431 of the third lens element 430 is R5, the radius of curvature of the image-side surface 432 of the third lens element 430 is R6, and they satisfy the relations:

$$R3/R4=0.43;$$

$$R5/R6=1.29.$$

In the fourth embodiment of the present imaging lens assembly, the on-axis spacing between the first lens element 410 and the second lens element 420 is T12, and it satisfies the relation: T12/f=0.15.

In the fourth embodiment of the present imaging lens assembly, the radius of curvature of the object-side surface 451 of the fifth lens element 450 is R9, the radius of curvature of the image-side surface 452 of the fifth lens element 450 is R10, and they satisfy the relation: R9/R10=0.93.

In the fourth embodiment of the present imaging lens assembly, the radius of curvature of the object-side surface 411 of the first lens element 410 is R1, and it satisfies the relation: R1/f=0.80.

In the fourth embodiment of the present imaging lens assembly, the imaging lens assembly is further provided with an electronic sensor at the image plane 470 on which an object is imaged. The on-axis spacing between the object-side surface 411 of the first lens element 410 and the electronic sensor is TTL, half of the diagonal length of the effective pixel area of the electronic sensor is ImgH, and they satisfy the relation: TTL/ImgH=1.64.

The detailed optical data of the fourth embodiment is shown in FIG. 11 (TABLE 7), and the aspheric surface data is shown in FIG. 12 (TABLE 8), wherein the units of the radius of curvature, the thickness and the focal length are expressed in mm, and HFOV is half of the maximal field of view.

It is to be noted that TABLES 1-8 (illustrated in FIGS. 5-12 respectively) show different data of the different embodiments, however, the data of the different embodiments are obtained from experiments. Therefore, any imaging lens assembly of the same structure is considered to be within the scope of the present invention even if it uses different data. TABLE 9 (illustrated in FIG. 13) shows the data of the respective embodiments resulting from the equations.

What is claimed is:

1. An imaging lens assembly, comprising in order from an object side to an image side:
   a first lens element with positive refractive power having a convex object-side surface;
   a second lens element with negative refractive power having a concave object-side surface;
   a third lens element with positive refractive power having a concave object-side surface and a convex image-side surface;
   a fourth lens element with negative refractive power; and
   a fifth lens element;
   wherein an on-axis spacing between the first lens element and the second lens element is T12, a focal length of the imaging lens assembly is f, and they satisfy the relation: 0.005<T12/f<0.25; and
   wherein the fifth lens element is made of plastic material, and the image-side surface of the fifth lens element is aspheric with at least one inflection point.

2. The imaging lens assembly according to claim 1, wherein the fourth lens element has a convex object-side surface and a concave image-side surface.

3. The imaging lens assembly according to claim 2, wherein a radius of curvature of the object-side surface of the first lens element is R1, a focal length of the imaging lens assembly is f, and they satisfy the relation: 0.30<R1/f<0.75.

4. The imaging lens assembly according to claim 1 further comprising an aperture stop disposed between an imaged object and the first lens element.

5. The imaging lens assembly according to claim 4, wherein a radius of curvature of the object-side surface of the third lens element is R5, a radius of curvature of the image-side surface of the third lens element is R6, and they satisfy the relation: $1.0<R5/R6<1.5$.

6. The imaging lens assembly according to claim 1 further comprising an electronic sensor on which an object is imaged, wherein an on-axis spacing between the object-side surface of the first lens element and the electronic sensor is TTL, half of a diagonal length of an effective pixel area of the electronic sensor is ImgH, and they satisfy the relation: $TTL/ImgH<1.9$.

7. The imaging lens assembly according to claim 1,
wherein the first, second, third and fourth lens elements are made of plastic material, and object-side and image-side surfaces of each of the first, second, third and fourth lens elements are aspheric;
wherein the imaging lens assembly further comprises an electronic sensor on which an object is imaged; and
wherein an on-axis spacing between the object-side surface of the first lens element and the electronic sensor is TTL, half of a diagonal length of an effective pixel area of the electronic sensor is ImgH, and they satisfy the relation: $TTL/ImgH<1.9$.

8. The imaging lens assembly according to claim 7, wherein the fourth lens element has a convex object-side surface and a concave image-side surface.

9. The imaging lens assembly according to claim 7, wherein a radius of curvature of the object-side surface of the first lens element is R1, the focal length of the imaging lens assembly is f, and they satisfy the relation: $0.30<R1/f<0.75$.

10. The imaging lens assembly according to claim 7, further comprising an aperture stop disposed between an imaged object and the first lens element.

11. The imaging lens assembly according to claim 7, wherein a radius of curvature of the object-side surface of the third lens element is R5, a radius of curvature of the image-side surface of the third lens element is R6, and they satisfy the relation: $1.0<R5/R6<1.5$.

* * * * *